Feb. 3, 1970  B. E. ATTWOOD  3,493,685
POWER SUPPLY REGULATOR AND AMPLIFIER CIRCUITS
Filed Sept. 28, 1966  3 Sheets-Sheet 1

INVENTOR.
BRIAN ERNEST ATTWOOD
BY
AGENT

Feb. 3, 1970   B. E. ATTWOOD   3,493,685
POWER SUPPLY REGULATOR AND AMPLIFIER CIRCUITS
Filed Sept. 28, 1966   3 Sheets-Sheet 2

INVENTOR.
BRIAN ERNEST ATTWOOD
BY
AGENT

United States Patent Office 3,493,685
Patented Feb. 3, 1970

3,493,685
POWER SUPPLY REGULATOR AND AMPLIFIER CIRCUITS
Brian Ernest Attwood, Horley, England, assignor, by mesne assignments, to U.S. Philips Corporation, New York, N.Y., a corporation of Delaware
Filed Sept. 28, 1966, Ser. No. 582,630
Claims priority, application Great Britain, Nov. 17, 1965, 48,845/65
Int. Cl. H04j *3/00*
U.S. Cl. 179—15          8 Claims

ABSTRACT OF THE DISCLOSURE

A power supply regulator uses a pulse train where the pulse width is a function of the deviation of the load voltage from a reference voltage. The pulses control a controlled switch which in turn regulates the load voltage thus keeping it constant. Second and third signals e.g. audio and sweep, can be multiplexed and amplified in the pulse generator which is a saturating amplifier.

---

This invention relates to low-frequency amplifier circuits and to power supply circuits and the regulation thereof.

The invention relates particularly, though not exclusively, to the problem of stabilized power supplies in radio and television receivers. Usual stabilization techniques involve the use of a series regulator device which has to be capable of withstanding high dissipations. This is difficult at high power, especially in television receivers. For instance, in some recent television designs approximately 60 w. is required by the receiver requiring an expected maximum surge power dissipation of up to 22 w. for the series regulator device.

It is one of the objects of the present invention to provide a simple yet efficient combined low-frequency amplifier and stabilized power supply circuit which is transformerless and is capable of using a relatively low dissipation regulator device while providing the low-frequency amplification with very few additional components.

Co-pending application No. 534,307 filed on Mar. 15, 1966 describes in general terms a combined low-frequency signal amplifier and D.C. regulator circuit arrangement comprising a series regulator for carrying both the D.C. power and the low-frequency signal in the form of pulse current, control means for controlling said regulator so as to cause it to operate in the switching mode in such manner as to vary the timing of the pulses of said current in a manner related to both the amplitude of said low-frequency signal and variations of the output voltage at a pair of D.C. output terminals, first filter means for feeding the D.C. component from the output of the regulator to said D.C. output terminals while minimizing pulse frequency and LF ripple at said D.C. output terminals, and second filter means for feeding the amplified low-frequency component from the output of the regulator to a pair of low-frequency output terminals while minimizing pulse frequency ripple thereat.

In such an arrangement the low-frequency (for example audio) control of the regulator and the stabilizing control thereof may employ the same mode of pulse modulation (pulse width or frequency) or different modes.

The particular examples described and illustrated in FIGS. 2–4 of said application employ pulse frequency modulation for the regulation based on D.C. output voltage and the control means employ a breakdown device of the kind having two well-defined states (i.e. an "OFF" state and a fully conductive "ON" state), such device with an associated series resistor being connected in parallel with a charging capacitor and in series with a resistance through which the capacitor is charged up to the breakdown voltage. Such control circuit acts as a generator of pulses of sawtooth form and frequency—modulates said pulses for the D.C. regulation. This arrangement involves the use of a large and expensive regulator transistor and it is an object of the present invention to provide an improvement in or modification of the arrangements of the said prior application which permits the use of a smaller regulator transistor and also renders possible various additional applications and modes of operation.

The present invention provides an improved combined low-frequency (LF) signal amplifier and D.C. regulator circuit arrangement as disclosed in the aforementioned application. This improved circuit arrangement is characterized in that the said current pulses are varied only in width and in that the said control means comprise:

(a) means for obtaining a variable D.C. signal corresponding to fluctuations in the voltage between the D.C. output terminals,
(b) an amplifier for amplifying said variable D.C. signal which amplifier includes a voltage reference device,
(c) a constant-frequency sine-wave oscillator,
(d) a modulator for converting the oscillations of said oscillator into pulses which vary in width in accordance with the output of said amplifier and the LF signal, and
(e) a coupling from the output of said modulator to the control terminal of the series regulator.

Such an arrangement employs pulse width modulation both for D.C. regulation and LF amplification. Moreover, the regulator acts merely as a controlled switch whereas in the arrangements illustrated in the prior specification the regulator acts also as part of the control means.

Preferably the amplifier is arranged to amplify also the LF signal, and preferably also the circuit arrangement includes an energy recovery diode connected between the output side of the regulator and the appropriate D.C. output terminal.

In view of the use of a sine-wave oscillator, the modulator is adapted to obtain pulse-width modulation by applying a varying bias level to sinusoidal waves received from said oscillator, said bias level being controlled by the output of the amplifier.

Preferably the sine-wave oscillator is an LC oscillator having a low output impedance drive to the modulator. This permits the use of gating means for gating the low-frequency part of the circuit between alternative LF input and output terminals so as to provide LF multiplexing, said gating means being arranged for control and timing by the oscillator.

Other advantages of the use of an LC oscillator will also be described.

The series regulator may be a transistor employing its base lead as its control terminal, or it may be a gate-turn-off SCR (silicon-controlled rectifier) employing its gate lead as its control terminal. As for the voltage reference device, a Zener diode may be used.

In addition to stabilization, the D.C. part of the arrangement may, if desired, act as a D.C. converter so as to produce a considerable reduction in D.C. supply voltage with little loss of power and without the need for a step-down transformer.

The low-frequency signal may be an audio signal, and the invention is principally concerned with such cases which arise, typically, in radio and television receivers and the like. However, the invention is also applicable to other cases requiring a control loop with substantial power gain employing low-frequency signals other than audio (in particular, the low-frequency signal may be a field sawtooth deflection waveform for a cathode-ray tube, in which case the circuit arrangement is a combined field deflection amplifier and D.C. regulator arrangement).

Further objects and advantages will become apparent from the following specification taken in conjunction with the drawings in which.

An embodiment of the invention incorporating the above preferred features will be described by way of example with reference to FIG. 2 of the accompanying drawings, but a more general embodiment will first be described with reference to FIG. 1.

Figure 1:
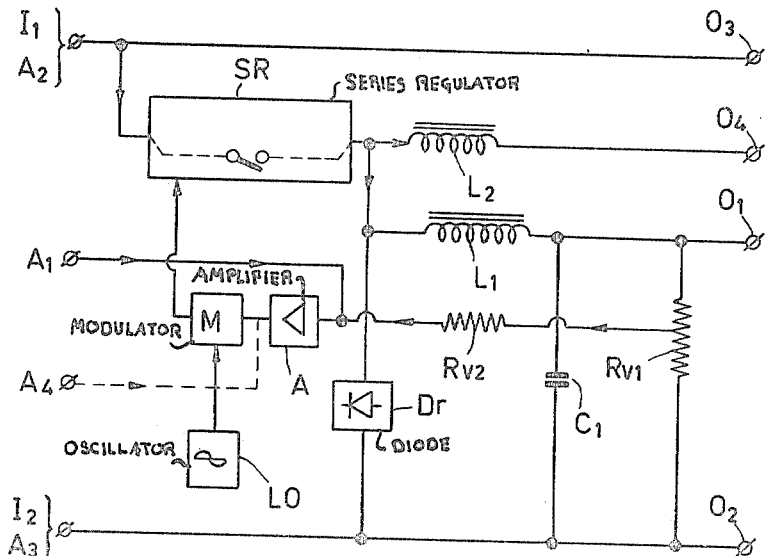
FIG. 1 is a schematic diagram partially in block of a first embodiment.

Referring to FIG. 1, the arrangement shown comprises a series regulator SR, D.C. input terminals I1–I2 and two alternative pairs of LF input terminals A1–A2 and A3–A4.

The first filter means comprise an inductor L1 and a capacitor C1 while the second filter means comprise an inductor L2.

The control means comprise:

(a) means Rv1–Rv2 for obtaining a variable D.C. signal corresponding to fluctuations in the voltage between D.C. output terminals O1–O2,
(b) an amplifier A for amplifying said variable D.C. signal which amplifier includes a voltage reference device (which renders the amplifier more sensitive),
(c) a constant-frequency sine-wave oscillator LO,
(d) a modulator M for converting the oscillations of said oscillator into pulses which vary in width in accordance with the output of said amplifier and the LF signal, and
(e) a coupling from the output of said modulator to the control terminal CT of the regulator.

The amplifier A is preferably arranged to amplify both the D.C. signal (from Rv1) and the LF signal (shown applied to it from (A1), but it is also possible to apply the LF input directly to the modulator without amplification as indicated by a dotted line from LF input terminal A4).

The circuit arrangement includes an energy recovery diode Dr connected between the output side of the regulator and the appropriate D.C. output terminal O2.

Preferably the sine-wave oscillator LO is an LC oscillator having a low output impedance drive to thte modulator M, in which case the oscillator does not need to be stabilized against changes of D.C. input voltage.

The low frequency signal may be an audio signal or a field deflection signal, or two such signals may be multiplexed by virtue of the use of a constant oscillator frequency. This will be explained more fully, but first a more detailed explanation will be given with reference to FIG. 2 as applied to an audio LF input.

Figure 2:
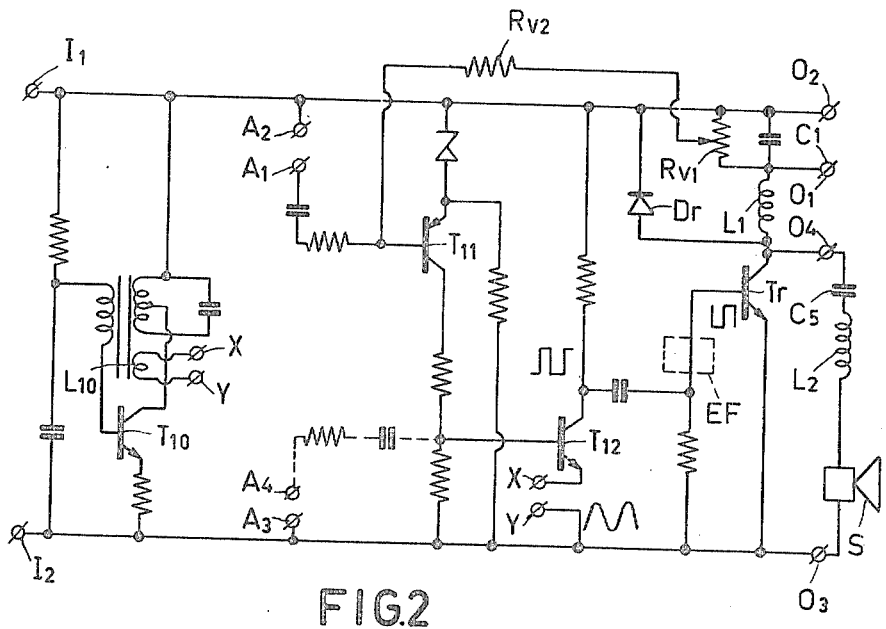
FIG. 2 is a detailed schematic of the embodiment of FIG. 1.

In the arrangement of FIG. 2 the regulator is a transistor Tr and the filters and terminals have the same reference numerals as in FIG. 1. Elements Rv1, Rv2 and Dr also have the same references.

The amplifier employs a transistor T11 and a voltage reference device constituted by a Zener diode. The oscillator employs a transistor T10 with a transformer having a secondary winding L10. This is coupled to points x–y in the emitter lead of a transistor T12 which acts as the modulator.

Figure 3:
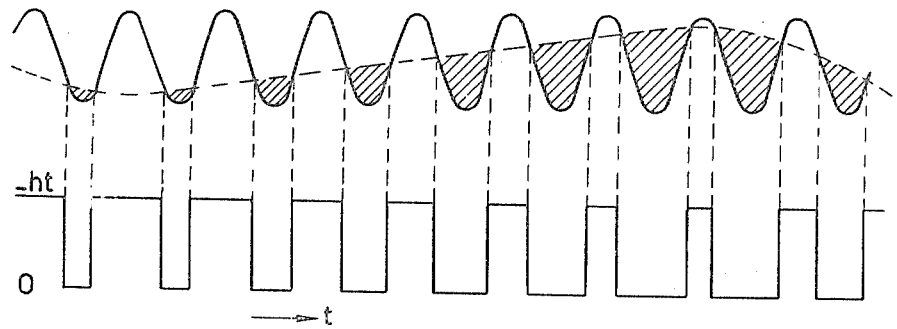
FIG. 3 is a graph of voltages at various points of FIGS. 1 and 2.

The LC oscillator produces a sine-wave at low impedance (this is important as aforesaid) which is applied to the emitter of T12. The amplitude of the sine-wave is such that, with a correctly chosen load resistor, transistor T12 saturates on negative-going excursions of the emitter with respect to the base potential. The effect of this is shown in FIG. 3 where the shaded areas of the sine-wave show where T12 conducts. Hence pulses having good amplitude and reasonable speed are available at the collector of T12, their width being substantially proportional to the combined audio-cumvariable D.C. signal from amplifier T11.

The speed of the switching cycle is further improved by the fact that only a small portion of the switching waveform is needed to operate Tr.

As a result of the D.C. available across the D.C. output terminals O1–O2 a portion (or all) of the output voltage is fed back via Rv1 to the base of T11 and compared to the Zener voltage at the emitter of T11, transistor T11 acts therefore partly as a D.C. amplifier whose output controls the base potential of T12.

Hence if the output voltage changes across the D.C. load (connected to terminals O1–O2) due to supply or load variations, the collector current of T11 will be changed and thus also the bias level of T12, in such a sense that the pulse width is changed to offset the voltage change at the output.

As discussed in the prior specification, it is possible to derive an audio signal from a switched mode stabilizer without affecting the D.C. stabilizer function because of: (a) the small percentage modulation required for satisfactory audio output (this is due to the fact that the D.C. output power is normally high compared to the audio output power) and (b) the long time constant of the D.C. load and its filter network (L1–C1) compared to the audio frequencies.

This audio input is applied (to the base of T12 or, preferably, the base of T11) at high impedance and low power levels and the audio output is available at the collector of Tr via a small filter L2–C5.

The use of an LC oscillator means that the switching frequency may be high (e.g. 60 kc./s.) to prevent undesirable beat notes on the audio.

Figure 4:
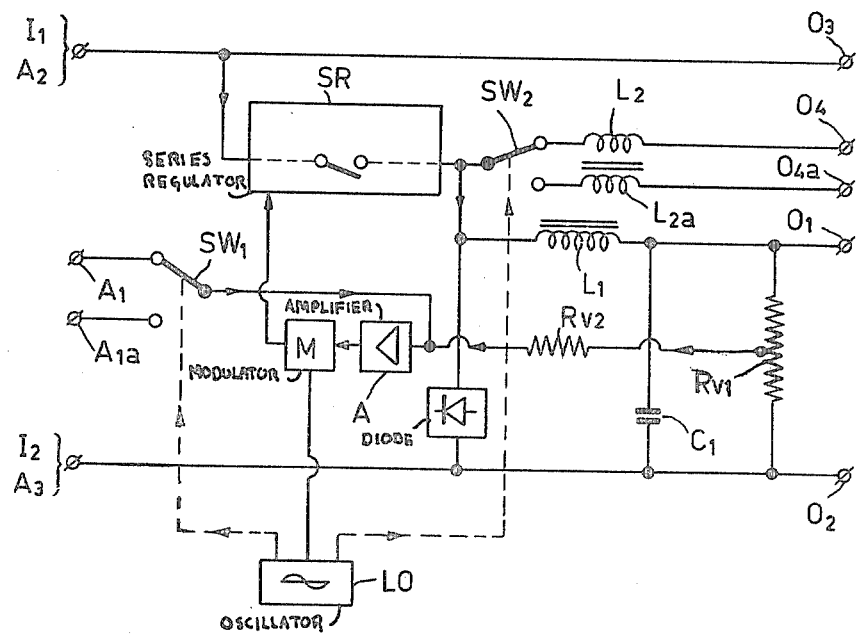
FIG. 4 is a diagram partially in block of a second embodiment of the invention.

Furthermore an LC oscillator has the useful facility of providing a very low impedance source by virtue of tappings or coupling windings into the main tuned circuit. This is useful since the low impedance ensures that amplitude variations in the oscillator do not affect the pulse width at the collector of T12, mainly due to the base of T12 following the emitter voltage. This only applies if the audio source provides substantially a voltage drive. The oscillator also has an advantage in that it provides a reference voltage having both amplitude and frequency substantially independent of the D.C. load and can thus be used for gating the LF channel to achieve a time-division multiplexing action. This is shown schematically in FIG. 4 where a switch SW1 is used to switch alternatively between input terminal A1 and an additional LF input terminal A1a. In synchronism with this, a second switch SW2 switches the LF output bewteen LF output circuit L2–O4 and an added LF output circuit L2a–O4a. Both switches are controlled by the oscillator IO.

In a practical circuit such as the circuit of FIG. 2, the easiest way in which this may be done is for the LC oscillator to work at half the frequency of the pulsed stabiliser. Thus, for example, a tapped tuned circuit tuned to the second harmonic may be used in the emitter circuit of T12. The positive and negative half-waves of the oscillator fundamental sine-wave may then be used in conjunction with two diodes to gate two LF input channels. The LF outputs are then separated by a gating circuit located between Tr collector and terminal O4.

If two audio channels are thus provided they may, for example, be used for stereophony. Alternatively, one channel may be used for the audio of a television receiver while the other channel carries LF in the form of a field sawtooth deflection waveform for the cathode-ray display tube. Thus the field deflection circuit can be in accordance with copending application No. 518,253 filed on Jan. 3, 1966 and an extremely economical arrangement can be obtained.

An arrangement in accordance with FIGURE 2 has given measured performance as follows:

TABLE I

| | |
|---|---|
| Nominal D.C. input voltage (at I1–I2) | 70 v. |
| Nominal output voltage (at O1–O2) | 25 v. |
| Nominal output power (at O1–O2) | 60 w. |
| Audio output in audio load | 2.5 w. approximately. |
| Efficiency (between I1–I2 and O1–O2) | 75–90%. |
| Input D.C. voltage variations of 40–110 v. | Output D.C. voltage variations of about 0.4 v. |
| Load variation from 1 w. to 60 w. | Output variation of 0.4 v. |

Figure 5:
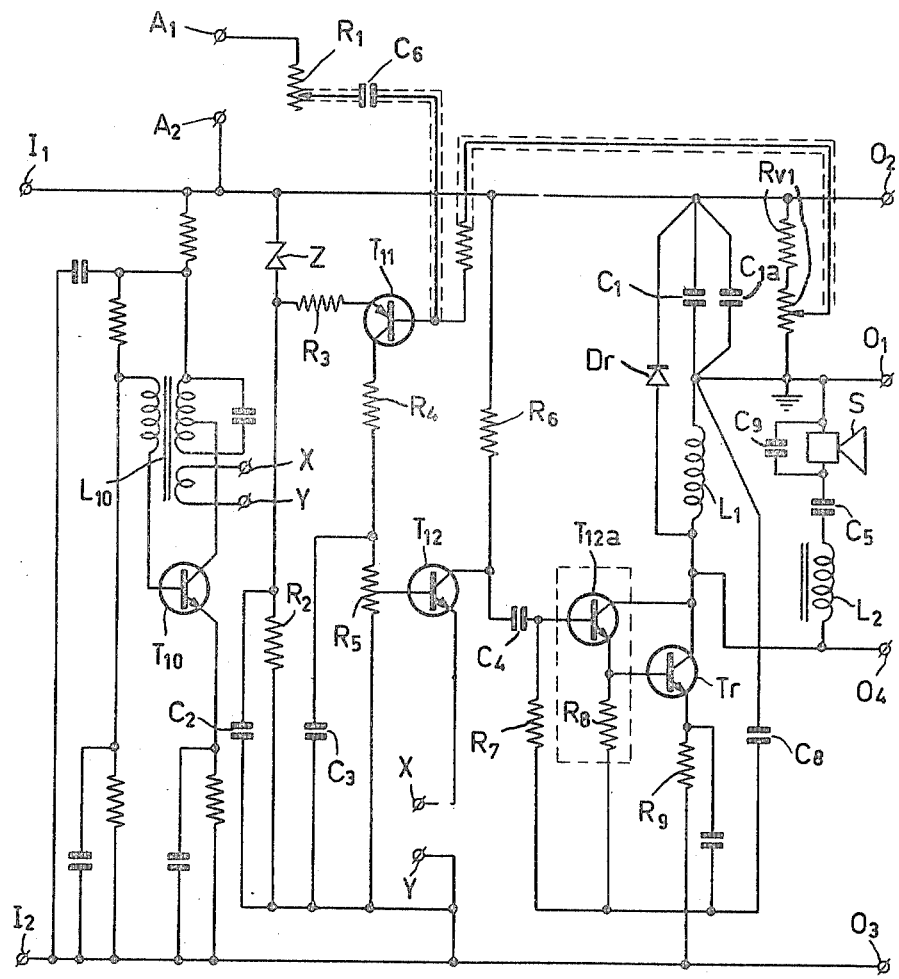
FIG. 5 is a detailed schematic of the embodiment of FIG. 2.

A more detailed version of the circuit of FIG. 2, having the performance given in the above table, is shown in FIG. 5. Here the preferred LF input terminals A1–A2 are used and there is a small change in the LF output circuit which, in this case, employs terminals O4–O1. Moreover, an emitter-follower stage T12a is inserted in the position marked "EF" in FIG. 2.

One practical set of values and components suitable for the arrangement of FIG. 5 is given below by way of illustration:

TABLE II

| | |
|---|---|
| Oscillator frequency | 40 kc. |
| Speaker S | 15 ohms |
| Transistor T10 | Mullard type ASY29. |
| Transistor T11 | Mullard type OC81. |
| Transistor T12 | Mullard type BFY52. |
| Transistor T12a | Mullard type BFY50. |
| Transistor Tr | Mullard type 11BU. |
| Diode Dr | Mullard type BY118 (fast improved version). |
| Zener Z | Mullard type OAZ213. |
| Inductance L1 | 16 mh. |
| Inductance L2 | 2 mh. |
| Resistor Rv1 | 2X1K. |
| Resistor Rv2 | 2.2K. |
| Resistor R1 | 50K. |
| Resistor R2 | 4.7K. |
| Resistor R3 | 120 ohms. |
| Resistor R4 | 2.2K. |
| Resistor R5 | 5K. |
| Resistor R6 | 4.7K. |
| Resistor R7 | 5.6K. |
| Resistor R8 | 33 ohms. |
| Resistor R9 | 3.3 ohms. |
| Capacitor C1 | 1000 μf. |
| Capacitor C1a | 1 μf. |
| Capacitor C2 | 1800 pf. |
| Capacitor C3 | 1800 pf. |
| Capacitor C4 | 6.4 μf. |
| Capacitor C5 | 400 μf. |
| Capacitor C6 | 25 μf. |
| Capacitor C7 | 400 μf. |
| Capacitor C8 | 1 μf. |
| Capacitor C9 | 1 μf. |

What is claimed is:

1. An electric circuit arrangement comprising first input means for a voltage source and first output means for producing a regulated load voltage, comprising means for producing a first signal having a value determined by variations of said load voltage from a given value, a first controlled switch coupled between said input means and said output means, means for generating a train of pulses having width variations substantially proportional to said first signal including means for amplifying having an input and an output and means for oscillating at a given frequency coupled to said amplifying means, means for applying said pulses to said controlled switch thereby to vary the conductance thereof for periods determined by the widths of said pulses, whereby said load voltage is held substantially constant by said control switch, second output means, second input means coupling second signals having a maximum frequency of one half of said oscillator frequency to said pulse train generating means, and means coupled to said first controlled switch for separating said second signals from said load voltage, and coupling said second signals to said second output means, whereby said second signals are amplified.

2. A circuit as claimed in claim 1 wherein said amplifying means comprises a saturating amplifier.

3. A circuit as claimed in claim 1 further comprising an energy recovery diode coupled to said first controlled switch and to said first output means.

4. A circuit as claimed in claim 1 further comprising an emitter follower circuit having an input coupled to said pulse train generating means and an output coupled to said first controlled switch.

5. A circuit as defined in claim 1 further comprising a constant voltage diode to define said reference voltage.

6. A circuit as defined in claim 1 further comprising a third output means, third output means for supplying third signals, second controlled switch coupled to said second and third input means and the input of said amplifying means, third controlled switch coupled to said second and third output means an the output of said amplifying means said second and third switches being synchronously controlled by said oscillator, said second switch alternately coupling the input of said pulse train generating means to said third and second signal sources, said third switch alternately coupling the output of said first controlled switch to said second and third output means, whereby said second and third signals are multiplexed and amplified.

7. A circuit as claimed in claim 6 wherein said second signal is an audio signal and said third signal is television deflection waveform.

8. A circuit as claimed in claim 6 further comprising a circuit tuned to the second harmonic of the oscillator coupled to the input of said pulse train generating means whereby said pulse train generating means operates at twice the frequency of said second and third controlled switches.

References Cited

UNITED STATES PATENTS

| | | | |
|---|---|---|---|
| 3,112,365 | 11/1963 | Kihara | 330—10 |
| 3,145,334 | 8/1964 | Berman | 321—2 |
| 3,191,126 | 6/1965 | Fowler | 330—10 |
| 3,256,492 | 6/1966 | Gilchrist | 330—10 |
| 3,260,924 | 7/1966 | Bridgeman | 323—18 |
| 3,286,157 | 11/1966 | Leostic | 323—18 |
| 3,323,037 | 5/1967 | Doss | 323—22 |
| 3,393,363 | 7/1968 | Forster | 325—142 |
| 3,418,433 | 12/1968 | Hodge | 332—9 |
| 3,218,393 | 11/1965 | Kahn | 179—15 |
| 3,388,214 | 6/1968 | Eilers | 179—15 |

ROBERT L. GRIFFIN, Primary Examiner

C. R. VONHELLENS, Assistant Examiner

U.S. Cl. X.R.

178—7.3; 323—38; 325—492

UNITED STATES PATENT AND TRADEMARK OFFICE
CERTIFICATE OF CORRECTION

PATENT NO. : 3,493,685
DATED : February 3, 1970
INVENTOR(S) : BRIAN ERNEST ATTWOOD ET AL It is certified that error appears in the above-identified patent and that said Letters Patent are hereby corrected as shown below:

IN THE SPECIFICATION col. 1, line 48, change "pulse" to -- pulsed --;

col. 3, line 54, change "thte" to -- the --;

col. 5, lines 35 to 69, cancel the table in its entirety and insert as follows: --

Table II

| | |
|---|---|
| Oscillator frequency | = 40Kc |
| Speaker S | = 15 ohms |
| Transistor T10 | = Mullard Type ASY29 |
| Transistor T11 | = Mullard Type OC81 |
| Transistor T12 | = Mullard Type BFY52 |
| Transistor T12a | = Mullard Type BFY50 |
| Transistor Tr | = Mullard Type 11BU |
| Diode Dr | = Mullard Type BY118 (fast improved version) |
| Zener Z | = Mullard Type OAZ 213 |
| Inductance L1 | = 16mH |
| Inductance L2 | = 2mH |

UNITED STATES PATENT AND TRADEMARK OFFICE
CERTIFICATE OF CORRECTION

PATENT NO. : 3,493,685
DATED : February 3, 1970
INVENTOR(S) : BRIAN ERNEST ATTWOOD ET AL It is certified that error appears in the above-identified patent and that said Letters Patent are hereby corrected as shown below:

| | |
|---|---|
| Resistor Rv1 | = 2X1K |
| Resistor Rv2 | = 2.2K |
| Resistor R1 | = 50K |
| Resistor R2 | = 4.7K |
| Resistor R3 | = 120 ohms |
| Resistor R4 | = 2.2K |
| Resistor R5 | = 5K |
| Resistor R6 | = 4.7K |
| Resistor R7 | = 5.6K |
| Resistor R8 | = 33 ohms |
| Resistor R9 | = 3.3 ohms |
| Capacitor C1 | = 1000 $\mu$F |
| Capacitor C1a | = 1 $\mu$F |
| Capacitor C2 | = 1800 pF |
| Capacitor C3 | = 1800 pF |
| Capacitor C4 | = 6.4 $\mu$F |

UNITED STATES PATENT AND TRADEMARK OFFICE
CERTIFICATE OF CORRECTION

PATENT NO. : 3,493,685
DATED : February 3, 1970
INVENTOR(S) : BRIAN ERNEST ATTWOOD ET AL It is certified that error appears in the above–identified patent and that said Letters Patent are hereby corrected as shown below:

$$\text{Capacitor } C5 = 400 \; \mu F$$
$$\text{Capacitor } C6 = 25 \; \mu F$$
$$\text{Capacitor } C7 = 400 \; \mu F$$
$$\text{Capacitor } C8 = 1 \; \mu F$$
$$\text{Capacitor } C9 = 1 \; \mu F \quad --;$$

Signed and Sealed this

Eleventh Day of January 1977

[SEAL]

*Attest:*

RUTH C. MASON
*Attesting Officer*

C. MARSHALL DANN
*Commissioner of Patents and Trademarks*